Feb. 3, 1931. J. O'DONNELL 1,791,143
GENERATOR FIELD CONTROL
Filed Oct. 28, 1927

Inventor:
Joseph O'Donnell
By his Attorneys
Redding, Greeley, O'Shea & Campbell

Patented Feb. 3, 1931

1,791,143

UNITED STATES PATENT OFFICE

JOSEPH O'DONNELL, OF HILLSIDE, NEW JERSEY, ASSIGNOR TO INTERNATIONAL MOTOR COMPANY, OF NEW YORK, N. Y., A CORPORATION OF DELAWARE

GENERATOR FIELD CONTROL

Application filed October 28, 1927. Serial No. 229,319.

This invention deals with the field control of generators used in connection with vehicle drives wherein a gasoline engine drives an electric generator which supplies current to the driving motors at the wheels. Proper excitation of the generator field for such service requires a teaser field winding and existing designs incorporate the circuit of such winding within the operating circuits so that suitable relays cut the winding in and out at the appropriate time when it is most desirable to strengthen or weaken the generator field.

The teaser field circuit has heretofore been controlled by two relays, one in the ignition circuit to connect the battery in the field circuit when the ignition circuit is closed and another operated by the accelerator pedal to complete the field circuit when the pedal is depressed to accelerate the vehicle. These two relays have proved to be a constant source of trouble, since the replacing of contacts due to the repeated operation of the relays requires frequent servicing.

An object of the present invention is to simplify the operation of the power unit described above as well as the circuits in which the generator armature and fields are connected. In accomplishing this result, two relays are eliminated, the teaser field being operated directly from the standard lighting generator.

A further object of the invention is to combine the circuit of the controller interlock relay with that of the teaser field so that the relay is automatically energized and deenergized at the proper times. By means of the connections provided for this operation, sufficient current is supplied to the interlock relay by the lighting generator, when the engine is speeded up for driving, to overcome the normal current which maintains the interlock inoperative and cause the controller to be locked when the vehicle is moving.

Further objects will appear as the description proceeds and reference will now be had to the accompanying drawings for a more detailed description thereof.

Figure 1:
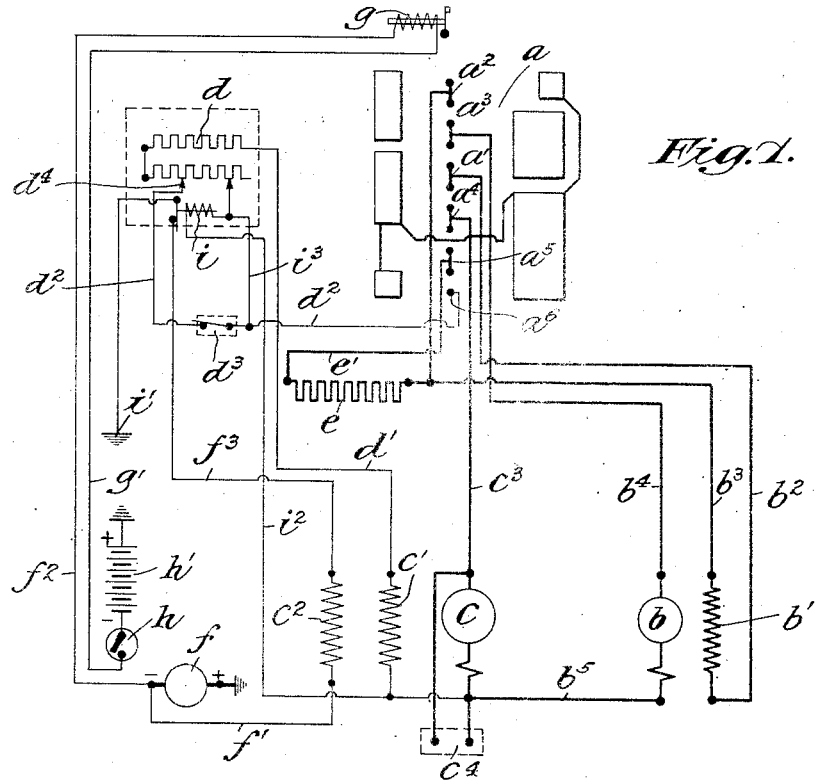
Figure 1 is a wiring diagram for the electrical connections of the driving unit of a gasoline electric driven vehicle.
Figure 2:
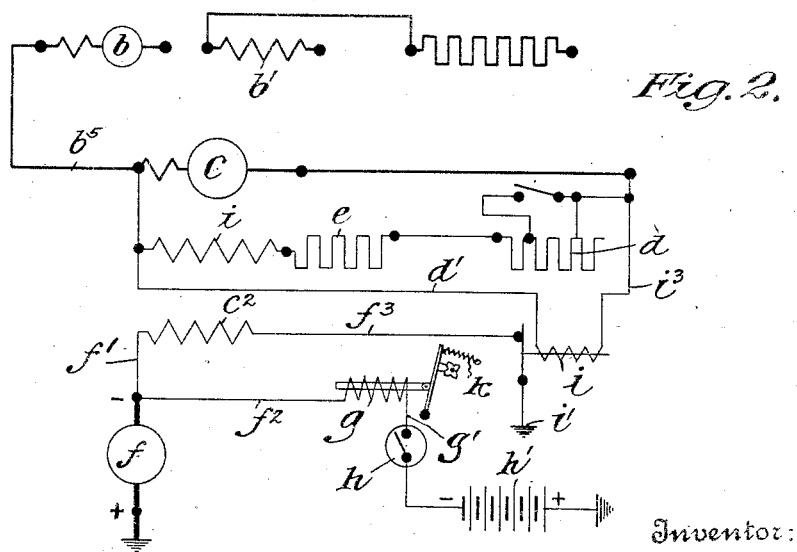
Figure 2 is a diagram, somewhat simplified, showing the invention in greater detail.

Referring particularly to Figure 1, a suitable controller which may be manually operated is indicated at $a$ and the driving motor at $b$. The motor field is shown at $b'$ and the wires for changing the polarity thereof are shown at $b^2$ and $b^3$, the former being connected to the controller drum contact $a'$ and the latter to contact $a^2$. The armature of motor $b$ is connected to a controller drum contact $a^3$ through wire $b^4$ and to the generator $c$ through wire $b^5$. Generator $c$ is provided with a shunt field $c'$ and a teaser field $c^2$ and is connected to controller drum contact $a^4$ by wire $c^3$. Suitable testing terminals $c^4$ may be provided, if desired, and resistor $d$ is connected in the shunt field circuit by means of wire $d'$. The resistor is then connected to controller drum contact $a^6$ through wire $d^2$, foot switch $d^3$ and adjustable contact $d^4$. A suitable resistance $e$ is connected to the motor field $b'$ through wire $b^6$ and to controller drum contact $a^5$ through wire $e'$.

The vehicle auxiliary lighting generator is shown at $f$ and connected to the teaser field $c^2$ through wire $f'$. A magnetic interlock $g$ is provided to prevent movement of the controller after the vehicle has started and this interlock is connected to the generator through wire $f^2$ and to the ignition switch $h$ through wire $g'$. The other terminal of the ignition switch $h$ is connected to a twelve volt lighting battery $h'$ and both the battery and generator $f$ are grounded as clearly shown. Teaser field $c^2$ is also connected, through wire $f^3$, with one contact of a relay $i$, the other contact of which is grounded at $i'$. The coil of this relay is connected across the shunt field of the generator through wires $i^2$ and $i^3$ and when the shunt field has built up sufficiently, the relay is operated to break the teaser field circuit.

When the vehicle is at rest, and the lighting generator is not being driven, on closing switch $h$, a negligible current flow takes place through the teaser field from the battery $h'$ in view of the fact that the electro-responsive coil $g$ of the interlock is designed to limit this flow. As the engine speeds up, the generator $f$ is driven to energize the teaser field, this field being grounded at $i'$ since the relay $i$ is not energized. At idling speed, the shunt field of the main generator $c$ is not sufficiently excited to operate the relay $i$ and, therefore, at this speed, the teaser field is energized by the lighting generator. The generator $f$ serves as a ground for the coil of the interlock $g$ at idling speed, but as the engine speeds up, the voltage generated by generator $f$, opposing that of the battery $h'$, deenergizes the interlock $g$ permitting a spring $k$ to lock the controller in the position to which it has been turned. It will thus be seen that at driving positions of the controller, the lighting generator voltage balances that of the battery to permit the interlock to operate and that, at idling speed, the interlock is energized by the battery $h'$ to cause it to disengage the controller mechanism. At idling speeds, the teaser field $c^2$ is energized by the lighting generator $f$ but it is disconnected by relay $i$ when the excitation of the shunt field $c'$ reaches a predetermined amount.

No limitation is to be placed upon the manner of connecting the elements described herein, the invention being defined in the appended claims.

I claim as my invention:

1. In a vehicle gasoline electric drive, a main generator for supplying automative current, a teaser field for the main generator, a lighting generator, means to connect the teaser field to the lighting generator, a battery, a controller interlock having a coil for limiting the flow of battery current, means connecting the interlock coil to the lighting generator and battery, whereby at speeds below a predetermined value the coil will be energized and at speeds above said value the coil will be deenergized to lock the controller.

2. In a vehicle gasoline electric drive, a main generator for supplying automative current, a teaser field for the main generator, a lighting generator, means to connect the teaser field to the lighting generator, means to disconnect the teaser field when the main generator reaches a predetermined excitation, a battery, a controller interlock having a coil to limit the flow of battery current, means connecting the interlock coil to the lighting generator and battery, whereby at speeds below a predetermined value the coil will be energized and at speeds above said value the coil will be deenergized to lock the controller.

3. In combination, a generator having a teaser field, a controller for the generator, means to lock the controller, an auxiliary generator for energizing the teaser field, and means responsive to the output of the auxiliary generator to cause said first-named means to lock and unlock the controller.

4. In combination, a grounded lighting generator, a field circuit connected thereto, a grounded battery, a controller interlock for limiting the flow of battery current, and means independent of the field circuit to connect the interlock with the battery and generator, whereby the latter serves as a ground when driven at speeds below a predetermined value and neutralizes the battery current through the interlock when driven at speeds above said value.

5. In combination, a lighting generator, a battery, a main generator, a teaser field therefor, an interlock having a coil for limiting the flow of battery current, means to connect the teaser field to the lighting generator, and means to connect the coil to the lighting generator and battery to be energized by the latter when the speed of the lighting generator is below a predetermined value and deenergized by the lighting generator current opposing the battery current when its speed is above the predetermined value.

This specification signed this 24th day of October A. D. 1927.

JOSEPH O'DONNELL.